(12) United States Patent
Hyman

(10) Patent No.: US 10,152,729 B2
(45) Date of Patent: *Dec. 11, 2018

(54) LOCATION-BASED SERVICE USING ZONES

(71) Applicant: Boaz Hyman, Modi'in (IL)

(72) Inventor: Boaz Hyman, Modi'in (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/656,562

(22) Filed: Jul. 21, 2017

(65) Prior Publication Data

US 2017/0323341 A1    Nov. 9, 2017

Related U.S. Application Data

(63) Continuation of application No. 15/267,314, filed on Sep. 16, 2016, which is a continuation of application No. 14/164,303, filed on Jan. 27, 2014, now Pat. No. 9,479,545.

(60) Provisional application No. 61/761,714, filed on Feb. 7, 2013, provisional application No. 61/775,769, filed on Mar. 11, 2013.

(51) Int. Cl.
| | |
|---|---|
| *H04W 76/00* | (2018.01) |
| *G06Q 30/02* | (2012.01) |
| *H04L 29/06* | (2006.01) |
| *H04W 4/02* | (2018.01) |
| *H04W 36/36* | (2009.01) |
| *H04W 4/021* | (2018.01) |

(52) U.S. Cl.
CPC ..... *G06Q 30/0261* (2013.01); *G06Q 30/0267* (2013.01); *H04L 65/1069* (2013.01); *H04W 4/02* (2013.01); *H04W 4/021* (2013.01); *H04W 4/025* (2013.01); *H04W 36/36* (2013.01); *H04W 76/00* (2013.01)

(58) Field of Classification Search
CPC ............ G01S 5/0252; G06F 17/30241; G06F 17/30752; G06Q 30/0201; G06Q 50/01; H04L 51/02; H04M 1/72572; H04W 4/001; H04W 4/02; H04W 4/025; H04W 36/36; H04W 76/00
See application file for complete search history.

(56) References Cited

U.S. PATENT DOCUMENTS

| | | | |
|---|---|---|---|
| 9,846,892 B2* | 12/2017 | Hyman | G06Q 30/0261 |
| 2008/0072284 A1* | 3/2008 | Horvitz | G06F 17/30241 726/2 |
| 2008/0248815 A1* | 10/2008 | Busch | H04W 4/02 455/456.5 |
| 2009/0005021 A1* | 1/2009 | Forstall | H04M 1/72572 455/414.3 |
| 2010/0076968 A1* | 3/2010 | Boyns | G06F 17/30241 707/732 |
| 2012/0005023 A1* | 1/2012 | Graff | G06Q 30/0201 705/14.58 |

(Continued)

*Primary Examiner* — Le H Luu
(74) *Attorney, Agent, or Firm* — Myers Wolin, LLC

(57) ABSTRACT

A location-based information system and method therefor, which is responsive to the user's selection of geographic zone and parameters. A proprietary app (application) is installed in a mobile device of the user, which insures that a connection to the user from a caller is based on the user's defined zone and other parameters without the disclosing the exact location of the user. Various embodiments of the invention provide an option for user-to-user location-based connection without depending on a remote server.

15 Claims, 4 Drawing Sheets

(56) References Cited

U.S. PATENT DOCUMENTS

| | | | | |
|---|---|---|---|---|
| 2012/0323938 A1* | 12/2012 | Skeen | ............... | G06F 17/30752 |
| | | | | 707/754 |
| 2012/0330722 A1* | 12/2012 | Volpe | ................. | G06Q 30/0201 |
| | | | | 705/7.32 |
| 2013/0097246 A1* | 4/2013 | Zifroni | ................... | G06Q 50/01 |
| | | | | 709/204 |
| 2013/0317944 A1* | 11/2013 | Huang | .................. | G01S 5/0252 |
| | | | | 705/26.61 |
| 2014/0052681 A1* | 2/2014 | Nitz | ....................... | H04L 51/02 |
| | | | | 706/46 |
| 2014/0201331 A1* | 7/2014 | Kershaw | ............... | H04W 4/001 |
| | | | | 709/219 |

\* cited by examiner

LOCATION-BASED SERVICE USING ZONES

CROSS REFERENCE TO RELATED APPLICATIONS

This application is a continuation of U.S. patent application Ser. No. 15/267,314, filed Sep. 16, 2016, entitled "Zone-Based Location-Based Service", which is a continuation of U.S. patent application Ser. No. 14/164,303, filed Jan. 27, 2014; entitled "User-To-User Selectable Location-Based Information Service", which claims benefit of U.S. Provisional Patent Application Ser. No. 61/761,714, filed Feb. 7, 2013, entitled "User-Selectable Location-Based Information Service"; and U.S. Provisional Patent Application Ser. No. 61/775,769, filed Mar. 11, 2013; entitled "User To User-Selectable Location-Based Information Service", the disclosures of which are hereby incorporated by reference for all purposes and without giving rise to disownment and the priorities of which are hereby claimed.

BACKGROUND

A location-based information service provides information and/or functionalities to a user of a mobile device according to the mobile device's current physical location.

Unfortunately, however, the user currently has only limited control over the information received from, and sent to, location-based information services. Typically, a particular location-based information service is either enabled or disabled via an application ("app") on the user's mobile device. If disabled, no information is provided relating to the user's proximate physical location; and if enabled, all information relating to the user's physical location is provided from the server to the user's mobile device.

There is currently no mid-way between the extremes of a complete absence of location-based information when the related app on the user's mobile device is disabled to a complete providing of all location-based information when the app is enabled.

In addition, currently there is no way to get location-based information service that is based on the area without sending the exact location of the user.

Moreover, specific location-based information typically requires an active end-to-end wireless connection of some sort to a specific remote server that provides the location-based information. Although a variety of connections to the mobile device may exist (e.g., WiFi, cellular, etc., connecting to Internet, cellular networks, and Local Area Networks), there is no guarantee that the specific remote server providing the desired location-based information may be accessible at any particular time.

Also, currently there is no way to get location-based information service that is based on user to user connection without sending the exact location of the user and without having a server that connects between the users.

It would therefore be desirable to have a means by which the user may selectively control the level and degree of access by his or her mobile device to a location-based information service. It would also be desirable to enable access to location-based information between to users in cases when the remote server associated with the location-based information is not accessible. These goals are met by embodiments of the present invention.

SUMMARY

Various embodiments of the present invention provide a location-based information service which is responsive not only to user location, but also to the user's selection of the parameters and user's definition of geographic zone.

One embodiment of the invention provides use for a business, where prospective customers expose their location zones and connect to the business base on parameters which they set.

Another embodiment of the invention provides a local social network where every each user discloses his own zone area and certain other parameters, and establishes connections with other users based on that information. In related embodiments, parameters can include personal, social, weather issues, and so forth, for conversation or parameters such as gender, age, personal status, occupation, hobby, sport, social event, political, events, opinions, emotions, religion, facts, and so forth.

An additional embodiment of the invention provides locally-based games where every user discloses his own zone area and certain other parameters, and establishes connections with others based on the self-defined zone area and other self-defined parameters.

Definitions

The following definitions apply to the terms used in the present disclosure and the appended claims.

The term "geographical location" herein denotes a physical location that may be specified by a set of "coordinates", including, but not limited to: geographical coordinates such as global longitude, latitude, and altitude; grid coordinate systems (such as those of the Universal Transverse Mercator "UTM" grid); street addresses, floor numbers; and combinations thereof. Regardless of the way geographical location is expressed, however, the expression always results in an unambiguous location expressed in a standard format that can be used to find a particular position on the earth's surface.

The term "zone" herein denotes a set of geometrical boundaries including, but not limited to: lines, curved lines, planes, and curved surfaces, the parameters of which are specified by geographical locations as defined above, such that determine the practical limits of a user's position within the zone. According to embodiments of the invention: one or more zones may overlap; one or more zones may have identical boundaries; and one or more zones may lie completely within the boundaries of another zone.

According to various embodiments of the present invention, a zone has a "zone name" which is used to identify the zone to users. According to further embodiments, a zone also has a "zone code", which is used to identify the zones to servers and mobile devices.

The terms "brand" and "branded" herein denote a label or other identifier that identifies a particular location-based information provider, regarding aspects of providing location-based information according to various embodiments of the present invention. In certain embodiments, the name of a zone is "branded", or associated with a particular location-based information provider, such that different location-based information providers can refer to the same zone by different names; additionally, different location-based information providers can refer to different zones by the same name; further, different location-based information providers can refer to the same zone by the same name but provide different location-based information regarding the zone. Branding zones according to the identity of the location-based information provider allows distinguishing and properly identifying the zones regardless of how the zones are named.

In related embodiments, branding is done via a "zone code", which is formed by appending the zone name with a branding tag identifying the location-based information provider. In a specific related embodiment, the branding tag identifying the location-based information provider is an IP address, URL, or other valid address of a server operated by the location-based information provider.

Various embodiments of the present invention provide that an app installed on a second user device has control over the access of a first user device to first user data and first user zone identification regarding the second user's location; and vice versa. In a non-limiting example of this property, a second user residing in Los Angeles notifies a first user to call him when he (the first user) is in Los Angeles. Then, when the first user arrives in Los Angeles, the first user's app allows him to call the second user.

According to embodiments of the invention, a location-based information service is associated with at least one brand of location-based information which is defined for at least one geographical zone having a predefined geographical location, a zone name, and a zone code. The service provides a branded app to a user for installation on a mobile device, wherein the branded app is associated with the at least one brand of location-based information. Via the branded app, the user selects one or more brands of location-based information, and can browse lists and/or maps showing the names and locations of the zones where location-based information related to the selected brands is provided by a other mobile user or mobiles users and or remote server on a network, which communicates with the branded app installed on the user's mobile device.

In another embodiment of the invention, location-based information downloaded from the remote server by the branded app is stored locally in persistent non-transitory storage of the user's mobile device. This local non-transitory storage enables the user to access the location-based information even when there is no connection to the remote server. In one related embodiment, the branded app allows the user to access the locally-stored non-transitory information only when the user's mobile device is currently in the proper zone. In another related embodiment, the branded app allows the user to access the locally-stored information regardless of current location.

Therefore, according to an embodiment of the present invention, there is provided a method for controlling connection of a first user mobile device, the method including: (a) receiving, by a second user mobile device branded location-based information that includes at least one parameter related to a zone defined by the first user mobile device; (b) comparing at least one parameter related first user mobile device, a geographic location, and a second user mobile device parameter, (c) determining whether at least one of the first user mobile device parameters conforms to at least one second user mobile device parameter including a current geographic location of the second user mobile device; and (d) responsively to the determining, (e) if the branded location-based information conforms, then connecting the second user mobile device to the first user mobile device; and (f) if the information does not conform, then blocking the connection of the second user mobile device to the first user mobile device.

In addition, according to another embodiment of the present invention, there is provided a method for controlling connection of a first user mobile device, the method including: (a) retrieving at least one branded location-based information item from a local persistent non-transitory storage of the first user mobile device, wherein the branded location-based information item corresponds to a predetermined branded zone; (b) for each retrieved location-based information item, determining if the retrieved location-based information item conforms to at least one user-selected parameter of the first-user mobile device; and, (c) responsively to the determining, (d) if the branded location-based information item conforms thereto, then connecting the first user mobile device to a second user mobile device; and (e) if the branded location-based information does not conform thereto, then blocking the connection of the first user mobile device to the second user mobile device.

Moreover, according to still another embodiment of the present invention, there is provided a method for sending an item of branded location-based information corresponding to a predetermined branded zone to a user mobile device from a server on a network, the method including: (a) updating by the server at least one parameter related to a zone corresponding to the item of branded location-based information; (b) establishing a data connection from user mobile device over the network to the server; (c) receiving, from the user mobile device at least one parameter related to a zone related to the current location of the user mobile device; (d) determining whether the item of branded location-based information conforms to the at least one parameter, and (e) responsively to the determining, (f) if the item of branded location-based information conforms thereto, then sending the item of branded location-based information to the user mobile device via the data connection; and (g) if the branded location-based information does not conform thereto, then not sending the item of branded location-based information to the user mobile device.

According to additional embodiments of the invention, a user can update his zone and connection parameters in performing the above procedures as often as desired, and once a connection is established, the user can share any information he wants with his partner.

According to additional embodiments of the invention, the user mobile device can be a server. In further embodiments of the invention methods can be with many user mobile devices and many servers.

Further embodiments of the invention provide apps for user mobile devices, wherein an app includes machine-readable executable code in a persistent non-transitory storage, such that, when the machine-readable executable code is executed by a mobile device, the mobile device performs a method as disclosed herein.

BRIEF DESCRIPTION OF THE DRAWINGS

The subject matter disclosed may best be understood by reference to the following detailed description when read with the accompanying drawings in which.

Figure 1:
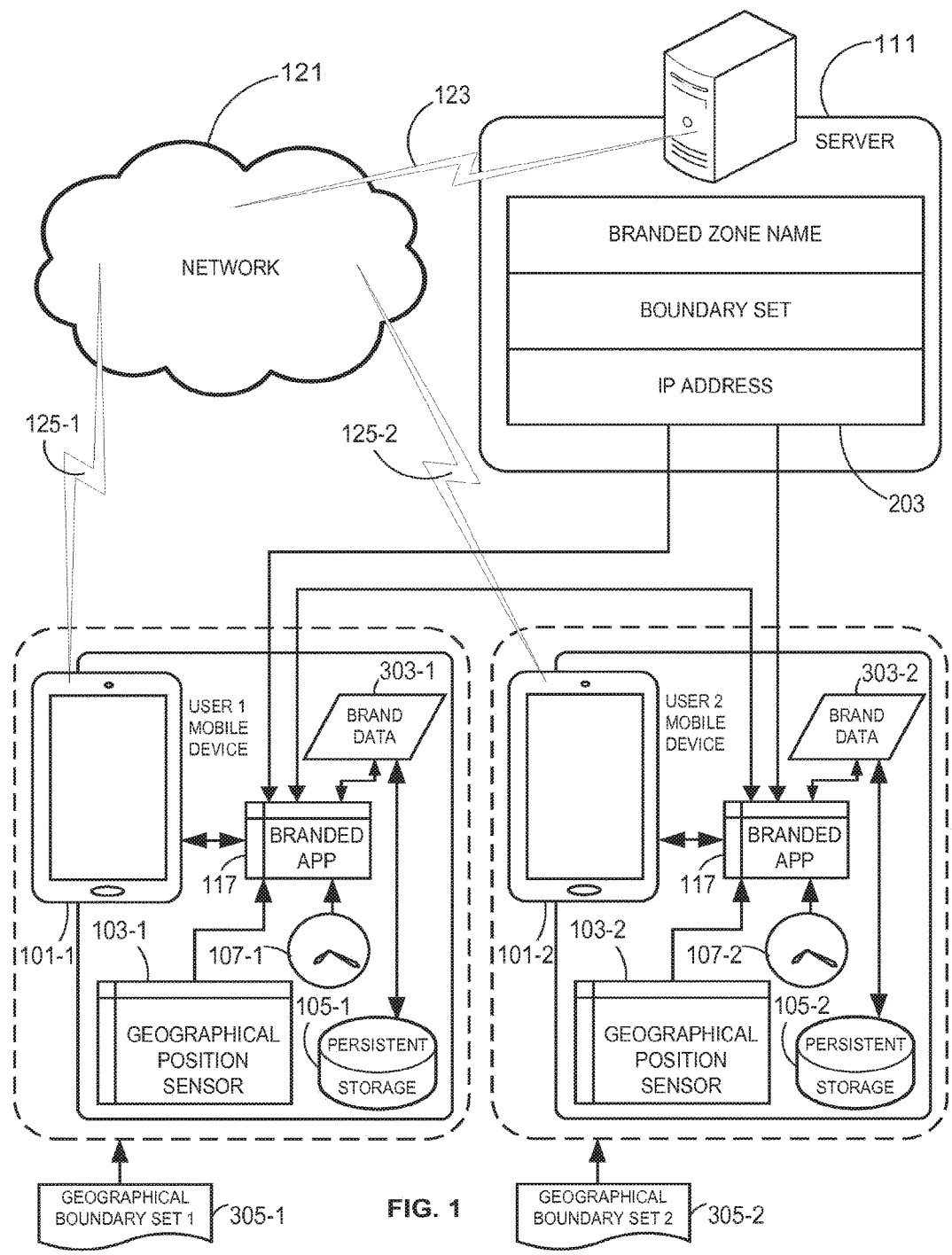
FIG. 1 conceptually illustrates a system according to an embodiment of the present invention.

For simplicity and clarity of illustration, elements shown in the figures are not necessarily drawn to scale, and the dimensions of some elements may be exaggerated relative to other elements. In addition, reference numerals may be repeated among the figures to indicate corresponding or analogous elements.

DETAILED DESCRIPTION

FIG. 1 conceptually illustrates a system according to an embodiment of the present invention, having a first user mobile device 101-1 which includes a geographical position sensor 103-1, a persistent non-transitory storage device 105-1, and a real-time clock 107-1.

Geographical position sensor 103-1 typically includes a GPS receiver, but can employ additional sensor technologies as well, such as identifying a nearby WiFi access point or cellular telephony network cell whose geographical positions are known. In particular, certain short-range wireless technologies (such as cellular base stations employing pico-cell or femtocell devices) can be used to supplement GPS receivers, particularly where GPS reception may be poor (such as in buildings). It is noted that in cases where short-range wireless technology is used to sense a location by proximity to an access point, the geographical location may be specified by the location of the base station in regular geographical coordinates, compatible with GPS location; alternatively, the location of the base station may be given in other forms, such as street address (e.g., "124 Main Street, 17th Floor, Suite A").

A remote server 111 connects to a network 121 via a connection 123, and contains brand data 203 for providing to mobile devices.

Branded data corresponds to a zone name 113-1 (FIG. 2) having a geographical boundary set 305-1, whose respective parameters are expressed in terms of geographical locations, as previously discussed in the definitions. Branded app 117 is installed in user mobile device 101-1, and sends brand data 303-1 to server 111 via a connection 125-1 in network 121. Branded app 117 is also installed in user mobile device 101-2, and receives branded data 303-1 from server 111 via a connection 125-2 in network 121. Geographical position sensor 103-2 notifies branded app 117 of the geographical position of mobile device 101-2, from which branded app 117 can determine whether mobile device 101-2 is located within geographical boundary set 305-1 corresponding to a zone name 113-1.

If branded data 303-1 conforms to user parameters, then branded app 117 connects to a user 101-1; and if the information does not conform then branded app 177 blocks the connection to user 101-1.

In some embodiments of the invention, branded app 117 is associated with a single brand. In these embodiments, when the user launches (or activates) branded app 117 on his or her mobile device, the single brand associated with branded app 117 is automatically selected. In other embodiments, branded app 117 is associated with multiple brands, from which the user may select one or more brands.

Figure 2:
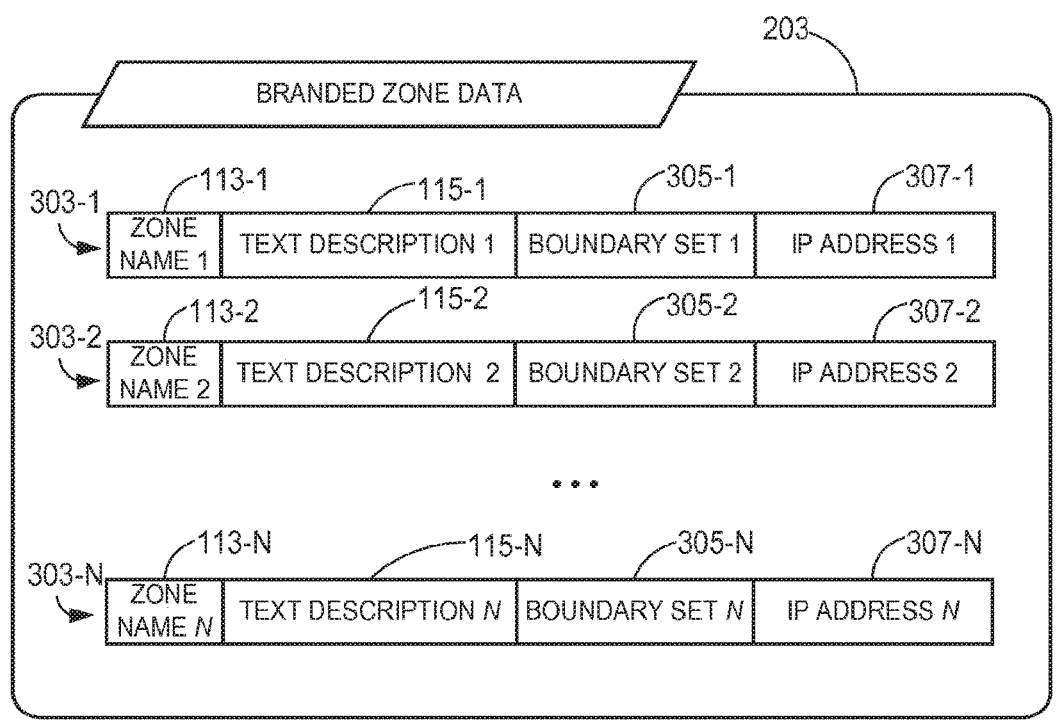
FIG. 2 conceptually illustrates the structure of brand zone data according to an embodiment of the present invention.

FIG. 2 conceptually illustrates the structure of branded zone data 203 according to an embodiment of the present invention. Branded zone data 203 contains a set 303 of N zone records 303-1, 303-2, . . . , 303-N, containing zone names 113-1, 113-2, . . . , 113-N corresponding to text descriptions 115-1, 115-2, . . . , 115-N, corresponding to geographical boundary sets 305-1, 305-2, . . . , 305-N, and corresponding to IP addresses 307-1, 307-2, . . . , 307-N. Text descriptions 307-1, 307-2, . . . , 307-N are intended for display to the user, to assist in identifying the zones in terms familiar to the user.

In an embodiment of the invention, branded zone data 203, after downloading from server 111, is stored by branded app 117 locally in a persistent non-transitory storage device 105-1 of mobile device 101-1, so that branded zone data 203 may be accessed by branded app 117 independent of a connection to server 111.

Figure 3:
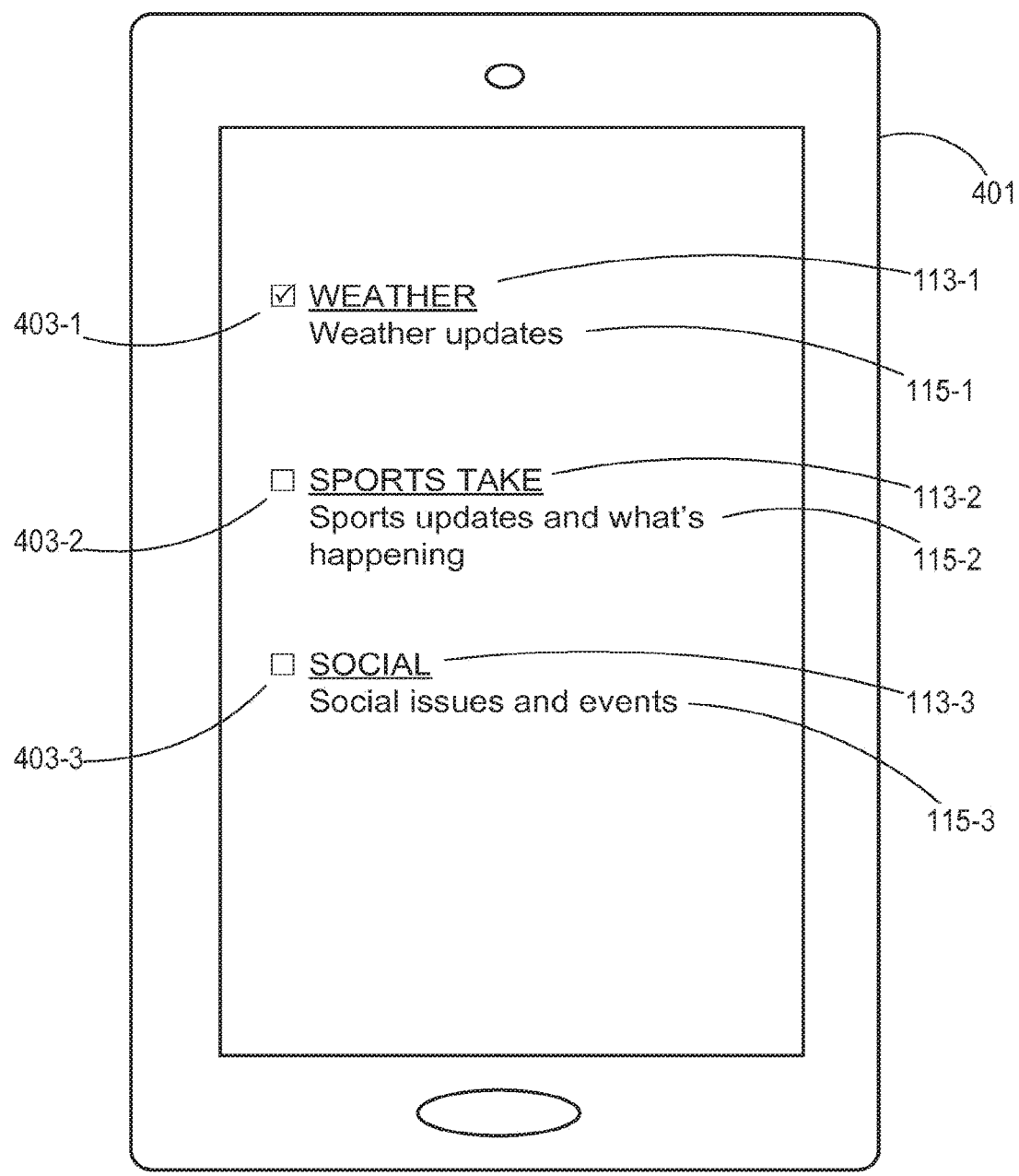
FIG. 3 illustrates a screen of a branded app which allows the user to select brands parameters to be received by the branded app, according to an embodiment of the present invention.

FIG. 3 illustrates a screen of branded app 117 (FIG. 1) which allows the user to select brands of location-based information to be received by branded app 117 for display on a user mobile device 401 according to an embodiment of the present invention. Brand names 113-1, 113-2, and 113-3 are non-limiting examples for the purpose of illustration, and correspond to brand zone name 113 (FIG. 2) of brand zone data 203 (FIG. 1 and FIG. 2) for the several different brands shown as non-limiting examples in FIG. 3. Likewise, brand descriptions 115-1, 115-2, and 115-3 are non-limiting examples for the purpose of illustration, and correspond to brand text description (FIG. 2) of brand data 203 (FIG. 1 and FIG. 2) for the several different brands shown as non-limiting examples in FIG. 3. User-checkable check boxes 403-1, 403-2, and 403-3, or functional equivalents thereof, provide a means for the user to indicate which, if any, of the displayed brands is to be selected for providing location-based information. In further embodiments of the present invention, the user can specify that a particular brand be selected during specified time periods (e.g., certain days of the week, certain hours of the day, for a specified number of days, up to a specified day of the calendar, etc.)

In the non-limiting example shown in FIG. 3, check box 403-1 indicates that brand name 113-1 has been selected, but brand names 113-2 and 113-3 have not been selected. Branded app 117 will receive and display branded location-based information corresponding to brand name 113-1, but not corresponding to brand names 113-2 or 113-3.

According to an embodiment of the present invention user can send back to other user his parameters to establish a connection, and therefore more steps are necessary to complete the connection process. In a related embodiment, the user can add more parameters, also requiring further steps to complete the connection process.

Figure 4:
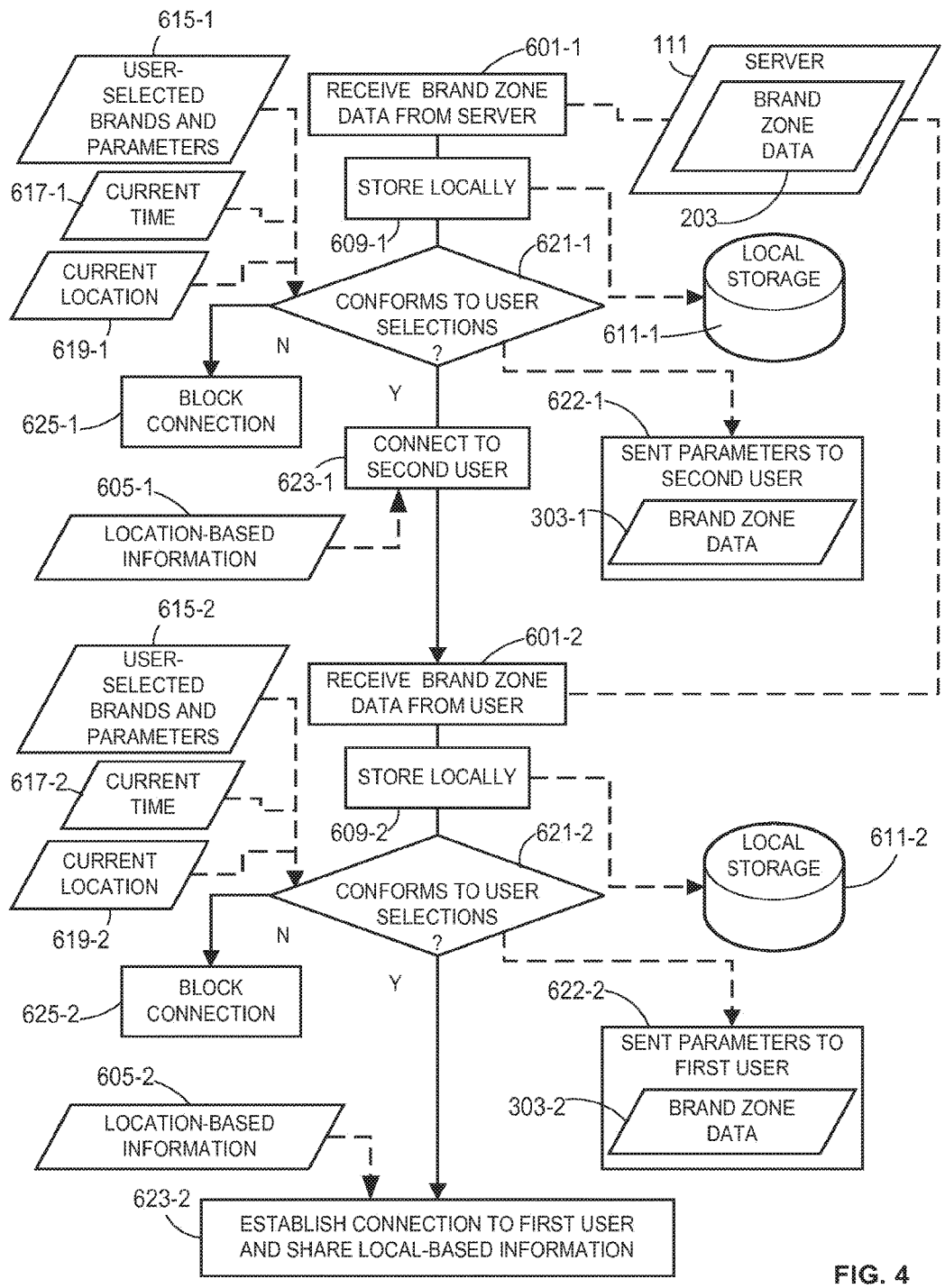
FIG. 4 is a flowchart of a method for a user mobile device according to an embodiment of the present invention.

FIG. 4 is a flowchart of a method for a user mobile device (such as device 101-1 of FIG. 1) according to an embodiment of the present invention. First user mobile device (such us user mobile device 101-1 FIG. 1) sends brand zone data 203 to remote server (such as server Ill of FIG. 1). In a step 601-2 a second user mobile device (such us user 101-2 FIG. 1) receives brand zone data 203 from the remote server.

According to a particular embodiment of the invention, in a step 601-2 second user mobile device 101-2 receives brand zone data from a local non-transitory storage device 611-2

According to another embodiment of the invention, in a step 609-2 the second user mobile device stores and updates data and information received from the remote server in a local non-transitory storage device 611-2.

At a decision point 621-2 user-selected parameters 615-2, current user geographic location 619-2, current time 617-2 are compared against corresponding first user-specified parameters that are part of brand zone data 203. In some embodiments of the invention, related parameters include time periods and/or zones for which information pertaining to certain brands is to be received.

If sent parameter 622-2 conforms, then second user parameters 303-2 are sent to first user mobile device 101-1.

If established connection 623-2 conforms, the second user is connected to the first user. According to a particular embodiment of the invention, in a step 623-2 location-based information 605-2 is sent to the first user. Otherwise, if the received information does not conform to the user's selections, in a step 625-2 the connection is blocked In a step 601-1 first user mobile device 101-1 receives brand zone data 303-2 (FIG. 2) from second user mobile device 101-2 (FIG. 1).

According to a further embodiment of the invention, in a step 609-1 user mobile device 101-1 stores and updates data and information received from user device 101-2 in a local non-transitory storage device 611-1.

At a decision point 621-1 user selected parameters 615-1, current user geographic location 619-1, and current time 617-1 are compared against brand zone data 303-2. In some embodiments of the invention, related parameters include time periods and/or zones for which information pertaining to certain brands is to be received.

If sent parameter 622-1 conforms then first user parameters 303-1 are sent to the second user. If the concoction conforms, then in a step 623-1 location-based information 605-1 is sent to second user mobile device 101-2. Otherwise, if the received information does not conform to the user's selections, in a step 625-1 the connection is blocked The methods illustrated in FIG. 4 and disclosed above are performed by branded app 117 executing machine-readable non-transitory executable code stored in the user mobile devices 101-1 and 101-2 as shown in FIG. 1.

What is claimed is:

1. A computer program product comprising a non-transitory computer readable storage medium retaining program instructions, which program instructions when read by a processor of a mobile device, cause the processor to perform a method comprising:
    determining, by the mobile device and without transmitting a location of the mobile device to an external device, that the a location-based information item is relevant to the mobile device;
    requesting to receive from a computerized device, the location based-information item, wherein said requesting comprises referring to a zone; and
    receiving, from the computerized device, the location-based information item corresponding to the zone.

2. The computer program product of claim 1, wherein the program instructions when read by a processor of a mobile device, cause the processor to perform a method comprising:
    obtaining a geographical zone definition of the zone;
    obtaining the current geographical location of the mobile device; and
    determining whether the current geographical location is within the geographical zone definition; and
    in response to a determination that the current geographical location is within the geographical zone definition, receiving, from the computerized device, the location-based information item corresponding to the zone,
    whereby location-based information is received from the computerized device without exposing the current geographical location of the mobile device thereto.

3. The computer program product of claim 2, wherein said obtaining geographical zone definition comprises receiving the geographical zone definition from the computerized device.

4. The computer program product of claim 2, wherein said obtaining the geographical zone definition comprises retrieving the geographical zone definition from a local storage, wherein the mobile device comprises the local storage.

5. The computer program product of claim 2, wherein said receiving is contingent on the geographical zone definition conforming to one or more parameters of the mobile device.

6. The computer program product of claim 5, wherein the one or more parameters comprise demographic information of a user of the mobile device.

7. The computer program product of claim 5, wherein the one or more parameters comprise current time, wherein the geographical zone definition is associated with one or more time periods in which the location-based information can be obtained.

8. The computer program product of claim 2, wherein the zone is associated with an address of the location-based information provider that is useful to receive the location-based information, wherein said receiving comprises connecting to the computerized device using the address of the location-based information provider.

9. The computer program product of claim 2, wherein the mobile device is a mobile device of a user and the computerized device is a mobile device of a user.

10. The computer program product of claim 2, wherein the computerized device is a server.

11. A method for provisioning location-based services to a mobile device, wherein said method is performed by a computerized device, wherein said method comprising:
    receiving, by the computerized device, a parameter sent by the mobile device, wherein the parameter relates to a zone, wherein the parameter is sent by the mobile device in response to a determination by the mobile device that a current geographical location of the mobile device is within a geographical zone definition of the zone, wherein the parameter does not comprise a current geographical location of the mobile device; and
    sending a location-based information item corresponding to the zone;
    whereby location-based information is sent from the computerized device without receiving the current geographical location of the mobile device thereto.

12. The method of claim 11, wherein the computerized device is a server of a location-based information provider.

13. The method of claim 11 further comprising, prior to said receiving, sending, by the computerized device to the mobile device, zone data of the zone, wherein the zone data comprising one or more parameter definitions of the zone, wherein the parameter definitions comprise the geographical zone definition.

14. The method of claim 13, wherein the parameter definition comprise at least one of a mobile device parameter, wherein the mobile device is configured to send the parameter in response to the mobile device conforming to the mobile device parameter.

15. The method of claim 13, wherein the parameter definition comprise at least one of a user parameter, wherein the mobile device is configured to send the parameter in response to a user of the mobile device conforming to the user parameter.

* * * * *